3,509,158
10,5 - (IMINOMETHANO) - 10,11 - DIHYDRO-5H - DIBENZO[a,d] - CYCLOHEPTENE AND DERIVATIVES

Thomas A. Dobson, Ville St. Laurent, Quebec, and Martin A. Davis, Montreal, Quebec, Canada, assignors to American Home Products Corporation, New York, N.Y., a corporation of Delaware
No Drawing. Filed Aug. 31, 1966, Ser. No. 576,207
Int. Cl. C07d 39/02
U.S. Cl. 260—287     23 Claims

ABSTRACT OF THE DISCLOSURE 10,5 - (iminomethano) - 10,11 - dihydro-5H-dibenzo-[a,d]-cycloheptene and derivatives of the formula:

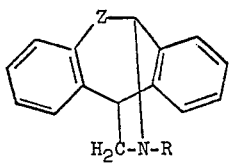

wherein Z represents a group selected from the group consisting of

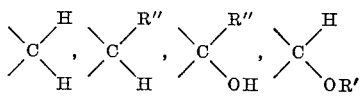

in which R and R' are the same or different and represent hydrogen, lower alkyl, allyl, aralkyl, dialkylaminoalkyl, heterocyclicalkyl, acyl, aroyl, or aralkanoyl, and R" represents lower alkyl, allyl, phenyl, aralkyl, or dialkylaminoalkyl. The compounds are useful as trichomonicidal, anti-convulsant, anti-parasitic, anti-inflammatory and hypotensive agents, and a process for preparing them from the corresponding 10,5-(iminomethano) - 10,11-dihydro-5H-dibenzo[a,d]cyclohepten-13-ones and methods for their use are also disclosed.

---

This invention relates to novel chemical compounds having useful biological properties and to intermediates used in their preparation. In particular, this invention relates to 10,5 - (iminomethano) - 10,11-dihydro-5H-dibenzo[a,d]-cycloheptene and to derivatives thereof, of the following formula:

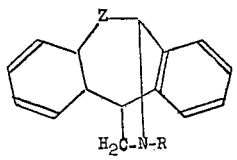

wherein Z represents a group selected from the group consisting of

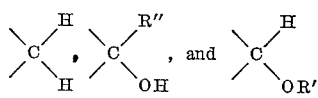

The substituents R and R' are the same or different and represent hydrogen, or an organic group, such as, for example, a lower alkyl group containing from 1–4 carbon atoms, an unsaturated lower alkyl group such as, for example, the allyl group, an aralkyl group containing from 7–10 carbon atoms, such as, for example, the benzyl, phenethyl, or trimethoxybenzyl group, a substituted dialkylaminoalkyl group containing from 4–9 carbon atoms, such as, for example, the dimethylamino-ethyl, diethylaminoethyl, dimethylaminopropyl, or diisopropylaminopropyl group, a heterocyclicalkyl group containing from 5–8 carbon atoms and from 1–2 hetero atoms, such as, for example, the pyrrolidinoethyl, piperidinoethyl, (N'-methylpiperazino)-ethyl, or morpholinoethyl group, an aliphatic acyl group containing from 2–4 carbon atoms, such as, for example, the acetyl, propionyl or butyryl groups, an aroyl group containing from 7–10 carbon atoms, or an aralkanoyl group containing from 8–12 carbon atoms, such as, for example, the benzoyl, phenylacetyl, trimethoxybenzoyl, or trimethoxyphenylacetyl, group, and R" represents an organic group, such as, for example, a lower alkyl group containing from 1–4 carbon atoms, an unsaturated lower alkyl group, such as, for example, the allyl group, the phenyl group, an aralkyl group containing from 7–10 carbon atoms, such as, for example, the benzyl, phenethyl, or trimethoxybenzyl group, or a substituted dialkylaminoalkyl group containing from 5–9 carbon atoms, such as, for example, the dimethylaminopropyl, diethylaminopropyl, or the diisopropylaminopropyl group. This invention also relates to the pharmacologically acceptable acid addition salts of the basic compounds of Formula I.

The main process utilized for the preparation of the compounds of Formula I is the reduction of a compound of Formula II with a complex alkali metal aluminium hydride to yield a corresponding compound of Formula I as shown in the following formulae:

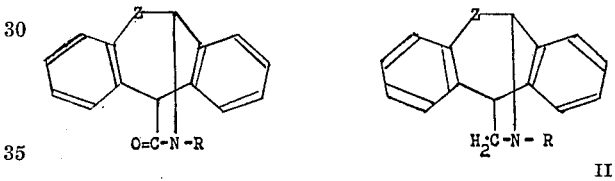

The procedures of alkylation, or of acylation optionally followed by reduction, of suitable compounds of Formula I may be employed as alternatives to the main process described above for the preparation of the compounds of Formula I.

The compounds of Formula I wherein either one or both of the substituents R and R' are themselves susceptible to reduction by a complex metal hydride, that is those compounds of Formula I wherein either one or both of the substituents R and R' represent an acyl, aroyl, or aralkanoyl group as defined above, are prepared by acylation, aroylation, or aralkanoylation of a compound of Formula I in which either one or both of the substituents R and R' are limited to represent hydrogen. The compounds of Formula I thus obtained may be further modified by the procedures of alkylation, acylation, hydrolysis or hydrogenolysis.

The compounds of Formula I wherein R is as defined above, with the proviso that it may not represent an aliphatic acyl, aroyl, or an aralkonoyl group as defined above, Z is limited to represent either a

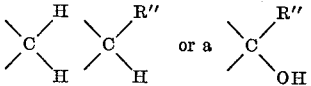

group, and R" is as defined above are prepared by treating a compound of Formula II in which R, Z and R" are limited as defined above, with a complex alkali metal hydride, to give the corresponding compounds of Formula I wherein R, Z and R" are limited as defined above.

The compounds of Formula I in which R is limited to represent hydrogen, Z is limited to represent the

group, and R' is limited to represent hydrogen are prepared by treating the compounds of Formula II in which R, Z, and R' are limited as defined above with a complex alkali metal aluminium hydride to give the compounds of Formula I in which R, Z and R' are limited as defined above.

The compounds of Formula I in which R is limited to represent an organic group as defined above, with the proviso that it may not represent an aliphatic acyl, aroyl, or aralkanoyl group as defined above, Z is limited to represent the

group, and R' is as defined above, with the proviso that it may not represent an aliphatic acyl, aroyl, or aralkanoyl group as defined above, are prepared by treating the compounds of Formula II in which R, Z and R' are limited as defined above, with a complex alkali metal aluminium hydride to give the corresponding compounds of Formula I in which R, Z, and R' are limited as defined above, with a complex alkali metal aluminium hydride to give the corresponding compounds of Formula I in which R, Z, and R' are limited as defined above.

The compounds of Formula I in which R represents an organic group as defined above, Z is as defined above, R' is limited to represent hydrogen, and R'' is as defined above are prepared by treating the corresponding compounds of Formula I, in which R and R' are both limited to represent hydrogen and Z and R'' are as defined above, with either an organic halide of the formula R—X in which R represents an organic group as defined above and X represents an halogen atom of atomic weight greater than 19, or a carboxylic acid anhydride of formula $R_2O$, in which R is limited to represent an aliphatic acyl, aroyl, or an aralkanoyl group as defined above, in the presence of a basic catalyst to give the corresponding compounds of Formula I in which R represents an organic group as defined above, Z is as defined above, R' is limited to represent hydrogen, and R'' is as defined above.

The compounds of Formula I in which R represents an organic group as defined above, Z is limited to represent the

group, and R' is limited to represent an organic group as defined above, are prepared by treating a compound of Formula I in which R is limited as defined above, Z is limited to represent the

group, and R' is limited to represent hydrogen, prepared as described above, with either an organic halide of the formula R'—X, in which R' represents an organic group as defined above and X represents a halogen atom of atomic weight greater than 19, or with a carboxylic acid anhydride of formula $R_2'O$ in which R' is limited to represent an aliphatic acyl, aroyl, or an aralkanoyl group as defined above, in the presence of a basic catalyst to give the compounds of Formula I in which R represents an organic group as defined above, Z is limited to represent the

group, and R' is limited to represent an organic group as defined above.

The compounds of Formula I in which R is limited to represent an aliphatic acyl, aroyl, or an aralkanoyl group as defined above, Z is as defined above, R' is as defined above with the proviso that it may not represent an aliphatic acyl, aroyl, or an aralkanoyl group, and R'' is as defined above, may be reduced with a complex metal aluminium hydride to give the compounds of Formula I in which R is limited to represent an alkyl, or an aralkyl group which has the carbon skeleton corresponding to the aliphatic acyl, aroyl, or aralkanoyl group as defined above, Z is as defined above, R' is limited as defined above, and R'' is as defined above.

The compounds of Formula I in which R is limited to represent hydrogen, Z is limited to represent the

group, and R' is as defined above with the proviso that it may not represent an aliphatic acyl, aroyl, or an aralkanoyl group as defined above, are prepared by the alkline hydrolysis of a compound of Formula I in which R is limited to represent an aliphatic acyl, aroyl, or an aralkanoyl group as defined above, Z is limited to represent the

group and R' is as defined above with the proviso that it may not represent an aliphatic acyl, aroyl, or an aralkanoyl group.

The compounds of Formula I in which R is limited to represent hydrogen, Z is limited to represent the

group, and R' is limited to represent an aliphatic acyl, aroyl, or an aralkanoyl group as defined above are prepared by treating 11-hydroxy-10,5-(iminomethano)-10,11-dihydro-5H-dibenzo[a,d]cycloheptene with carbobenzoxy chloride in the presence of a basic catalyst to give the corresponding 11-hydroxy-12-carbobenzoxy-10,5-(iminomethano)-10,11-dihydro-5H - dibenzo[a,d]cycloheptene. In its turn, this compound is treated either with an organic halide of the formula R'—X in which R' is limited to represent an aliphatic acyl, aroyl, or an aralkanoyl group as defined above, and X represents an halogen atom of atomic weight greater than 19, or with a carboxylic acid anhydride of formula $R_2'O$, in which R' is limited as defined above, in the presence of a basic catalyst to give the corresponding 11-acyloxy-, 11-aroyloxy-, or 11 - aralkanoyloxy-12-carbobenzoxy-10,5-(iminomethano)-10,11-dihydro - 5H - dibenzo[a,d]cycloheptene. In their turn, such compounds are hydrogenolyzed to give the corresponding compounds of Formula I in which R is limited to represent hydrogen, Z is limited to represent the

group, and R' is limited to represent an aliphatic acyl, aroyl, or an aralkanoyl group as defined above.

The compounds of Formula I in which R is limited to represent the methyl group, and the groups Z, R', and R'' are as defined above, are prepared by treating a compound of Formula I in which R is limited to represent hydrogen, and the group Z, R', and R'' are as defined above, with a mixture of formic acid and formaldehyde under the conditions of the Eschweiler-Clarke modification of the Leuckart reaction to give the compounds of Formula I in which R is limited to represent the methyl group, and the group Z, R' and R" are as defined above.

More specifically, the compounds of Formula I wherein R is as defined above, with the proviso that it may not represent an aliphatic acyl, aroyl, or an aralkanoyl group as defined above, Z represents either a

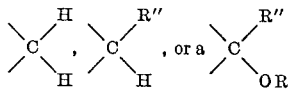

group, and R" is as defined above, are prepared by treating a compound of Formula II in which R, Z and R" are limited as defined above, either dissolved or suspended in an inert solvent such as, for example, tetrahydrofuran or dimethoxyethane or dioxan at a temperature within the range of 30°–100° C. with a complex alkali metal aluminium hydride, preferably lithium aluminium hydride, for a period of time of up to 24 hours to give, after hydrolysis of the resulting complex and extraction and purification of the organic product, the corresponding compounds of Formula I in which the groups R, Z, and R" are limited as defined above.

The compounds of Formula I in which R is limited to represent hydrogen, Z is limited to represent the

group, and R' is limited to represent hydrogen are prepared by treating a compound of Formula II, in which R, Z, and R' are limited as defined above, with a complex alkali metal aluminium hydride, preferably lithium aluminium hydride in a solvent such as, for example, tetrahydrofuran or dimethoxyethane or dioxan, to give after processing in a manner identical to that described above, the compounds of Formula I in which R, Z, and R' are limited as defined above.

The compounds of Formula I in which R is limited to represent an organic group as defined above, with the proviso that it may not represent an aliphatic acyl, aroyl, or an aralkanoyl group as defined above, Z is limited to represent the

group, and R' is as defined above, with the proviso that it may not represent an aliphatic acyl, aroyl, or an aralkanoyl group as defined above are prepared by treating a compound of Formula II, in which Z, R, and R' are limited as defined above, with a complex alkali metal aluminium hydride, preferably lithium aluminium hydride in a solvent, such as tetrahydrofuran, dimethoxyethane or dioxan to give, after processing in a manner identical with that described above, the compounds of Formula I wherein Z, R, and R' are limited as defined above.

The compounds of Formula I in which R is limited to represent an organic group as defined above, Z is as defined above, R' is limited to represent hydrogen, and R" is as defined above, are prepared in the following manner. Thus, a compound of Formula I in which R is limited to represent hydrogen, and the Z, R' and R" groups are limited as defined above, is dissolved in an inert solvent such as, for example, dioxan or dimethylformamide and treated with one molar equivalent of either an organic halide of the Formula R—X, in which R represents an organic group as defined above and X represents a halogen atom with an atomic weight greater than 19, and a molar excess of a basic condensing agent such as, for example, sodium bicarbonate, or with one molar equivalent of a carboxylic acid anhydride of the formula R₂O, in which R is limited to represent an aliphatic acyl, aroyl, or an aralkanoyl group as defined above, in the presence of a basic catalyst, such as, for example, pyridine for a period of time of from two to twelve hours at a temperature of from 30°–100° C. to give, after removal of the solvent and purification of the residue, the compounds of Formula I in which R represents on organic group as defined above, Z is as defined above, R' is limited to represent hydrogen, and R" is as defined above.

The compounds of Formula I in which R represents an organic group as defined above, Z is limited to represent the

group, and R' is limited to represent an organic group as defined above are prepared in the following manner. Thus, a compound of Formula I in which R is limited to represent an organic group as defined above, Z is limited to represent the

group, and R' is limited to represent hydrogen is dissolved in an inert solvent such as, for example, dioxan and treated with either one molar equivalent of an organic halide of the Formula R'—X in which R' represents an organic group as defined above and X represents an halogen atom of atomic weight greater than 19, and one molar equivalent of a basic codensing agent such as, for example, sodium hydride, or with one molar equivalent of a carboxylic acid anhydride of Formula R'₂O in which R' is limited to represent an aliphatic acyl, aroyl, or an aralkanoyl group as defined above in the presence of a basic catalyst, such as, for example, pyridine at a temperature within the range of 50°–100° C. for a period of time of from six to twelve hours to give, after removal of the solvent and purification of the residue the compounds of Formula I in which R represents an organic group as defined above, Z is limited to represent the

group, and R' is limited to represent an organic group as defined above.

The compounds of Formula I in which R is limited to represent hydrogen, Z is limited to represent the

group, and R' is as defined above with the proviso that it may not represent an aliphatic acyl, aroyl or an aralkanoyl group as defined above, are prepared in the following manner. Thus, a compound of Formula I in which R is limited to represent an aliphatic acyl, aroyl, or an aralkanoyl group, preferably an acetyl group, and Z and R' are limited as defined above, is treated with a molar excess of an alkali metal hydroxide, such as, for example, sodium or potassium hydroxide in either boiling water, or a boiling lower alkanol containing from 1–4 carbon atoms for a period of time of up to three days to give, after removal of the solvent and isolation and purification of the basic organic residue, the corresponding compound of Formula I in which R is limited to represent hydrogen, and Z and R' are limited as defined above.

The compounds of Formula I in which R is limited to represent hydrogen, Z is limited to represent the

group, and R' is limited to represent an aliphatic acyl, aroyl, or an aralkanoyl group as defined above, are prepared by treating 11-hydroxy-10,5-(iminomethano)-10,11-dihydro-5H-dibenzo[a,d]-cycloheptene with one molar proportion of carbobenzoxy chloride in an inert solvent, such as, for example, dioxan in the presence of a basic catalyst, such as, for example, pyridine to give the corresponding 11 - hydroxy - 12 - carbobenzoxy-10,5-(iminomethano)-10,11-dihydro-5H-dibenzo[a,d]cycloheptene. In its turn, this compound is treated with one molar proportion of an organic halide of the formula R′—X, in which R′ is limited to represent an aliphatic acyl, aroyl, or an aralkanoyl group as defined above, or with one molar proportion of a carboxylic acid anhydride of the Formula R′$_2$O, in which R′ is limited as defined above, in the presence of a basic catalyst, preferably pyridine, to give after removal of the solvent and purification of the residue the corresponding 11-acyloxy-, 11-aroyloxy-, or 11-aralkanoyloxy - 12 - carbobenzoxy - 10,5 - (iminomethano)-10,11-dihydro-5H-dibenzo[a,d]cycloheptene. In their turn, these compounds are dissolved in a suitable solvent, such as, for example, ethanol or ethyl acetate, and treated with hydrogen in the presence of a noble metal catalyst, such as, for example, a dispersion of palladium on charcoal to give, after removal of the catalyst and solvent and purification of the residue, the corresponding compounds of Formula I in which R, Z, and R′ are limited as defined above.

The compounds of Formula I in which R is limited to represent the methyl group, and Z, R′, and R″ are as defined above are prepared as follows. Thus, a mixture of a compound of Formula I in which R is limited to represent hydrogen, and in which the groups Z, R′, and R″ are as defined above, and a molar excess of formic acid and a molar excess of formic acid and a molar excess of formaldehyde is heated at a temperature within the range of 50–100° C. for a period of time of up to twelve hours to give, after evaporation of the solution, treatment of the residue with a molar excess of sodium bicarbonate solution, and purification of the resulting precipitate, the corresponding compounds of Formula I in which R is limited to represent a methyl group and Z, R′ and R″ are as defined above.

The compounds of this invention are active against *Trichomonas vaginals* and are useful as trichomonicidal agents. As such, they may be formulated with suitable excipients, such as, for example, starch or lactose, in the form of vaginal tablets or inserts containing from 50–250 mg. of the active ingredients and may be administered from one to three times per day.

Some of the compounds of this invention also possess anticonvulsant activity and are useful in treatment of certain disorders associated with convulsions. As such, they may be formulated with suitable excipients in the form of tablets or capsules containing from 75–300 mg. of the active ingredient and may be administered from one to several times per day.

Some of the compounds of this invention possess important antiparasitic activities which are demonstrated both in vitro and in vivo. They show a high degree or kill against the horse strongyle parasite and are thus useful for the decontamination of premises or pastures infested with this organism or other members of the strongylidae family, for example, hookworms, trichostrongylidae or metastrongylidae. For this purpose the compounds may be formulated with a suitable inert vehicle, such as, for example, water. The resulting suspension or solution may contain from 0.01 to 0.005 mole of the active ingredient per litre. The compound also possess activity against *Syphacia obvelata* in mammals and may be used to combat pinworm infestations. For this purpose the compound may be administered orally to mammals in dosages ranging from 50 to 500 mg./kg.

Certain compounds of this invention have anti-inflammatory activity are useful as anti-inflammatory agents in the treatment of rheumatic or related disorders caused by inflammatory processes. In particular, the compound 12-methyl-10,5-(iminomethano)-10,11-dihydro - 5H - dibenzo[a,d]cycloheptene has marked activity in the paw-edema assay. It may be formulated as dry power capsules or compressed tablets containing the necessary excipients, lubricants and binders. The formulations are compounded in such a manner so as to contain from 5–150 mg. of the active ingredients per unit dosage, said dosage to be given once to three times daily.

Certain compounds of this invention have hypotensive activity and are useful in the treatment of disorders associated with hypertension. In particular, the compounds of this invention in which Z is limited to represent either the group or the group have marked hypotensive activity when administered either intravenously or orally to mammals. They may be formulated as a suspension or solution in an appropriate equeous or oily vehicle for intravenous injection; for oral application they may be formulated as dry powder capsules or compressed tablets containing the necessary excipients or binders, such as, for example, starch or lactose. The formulations are compounded in such a manner so as to contain from 10–100 mg. of the active ingredients per unit dosage, said dosage form to be given from one to three times daily.

2,3,7,8 - tetramethoxy - 10,5 - (iminomethano) - 10,11-dihydro-5H-dibenzo[a,d]cycloheptene, also known as isopavine, prepared in the manner described by A. R. Battersby et al, in J. Chem. Soc. 1958, p. 1988, may be regarded as being formally related to the compounds of this invention. However, unexpectedly and surprisingly, the above-named compound is completely devoid of the anticonvulsant, anti-inflammatory, and hypotensive activities associated with the instant compounds.

The starting materials for the compounds of this invention, viz, the 10,5-(iminomethano)-10,11-dihydro-5H-dibenzo[a,d]cyclohepten-13-ones of Formula II in which R and R′ are as defined above with the proviso that they may not represent an aliphatic acyl, aroyl, or an aralkanoyl group as defined above, Z is as defined above and R″ is as defined above are prepared as described in our co-pending U.S. patent applications Ser. No. 552,387 filed May 24, 1966, now Patent No. 3,426,015, issued Feb. 4, 1969, Ser. No. 568,745 filed July 29, 1966.

In brief, 5H-dibenzo[a,d]cycloheptene 5-carboxamide, which may be prepared as described by M. A. Davis et al. in J. Med. Chem., 7, 88 (1964), is treated with one molar proportion of bromine and the resulting 10,11-dibromo - 10,11 - dihydro - 5H - dibenzo[a,d]cycloheptene-5-carboxamide is treated with either boiling water or a boiling alkanol containing from 1–4 carbon atoms to give 11 - bromo - 10,5 - (epoxymethano)-10,11-dihydro-5H-dibenzo[a,d]cyclohepten-13-one. In its turn, this compound is treated with either ammonium hydroxide, or an aqueous solution or suspension of an organic amine of the formula R—NH$_2$, in which R is as defined above with the proviso that it may not represent an aliphatic acyl, aroyl or an aralkanoyl group as defined above, to give a compound of Formula II in which R is limited as defined above, Z is limited to represent the group, and R′ is limited to represent hydrogen.

In their turn, the compounds of Formula II in which R is limited to represent hydrogen, Z is limited to represent the

group, and R' is limited to represent hydrogen may by alkylated by conventional procedures with an organic halide of the formula R—X, in which R represents an organic group as defined above with the proviso that it may not represent an aliphatic acyl, aroyl, or an aralkanoyl group as defined above, to give the corresponding compounds of Formula II in which R represents an organic group limited as defined above, Z is limited to represent the

group, and R' is limited to represent hydrogen. In their turn these compounds may be alkylated according to conventional procedures with an organic halide of the formula R'—X, in which R represents an organic group as defined above with the proviso that it may not represent an aliphatic acyl, aroyl, or an aralkanoyl group, and X represents an halogen with an atomic weight greater than 19, to give the corresponding compounds of Formula II in which R and R' are limited as defined above, and Z is limited to represent the

group.

Alternatively, the compounds of Formula II in which R represents either hydrogen, a lower alkyl group, or an aralkyl group as defined above, Z is limited to represent

group, and R' is limited to represent hydrogen may be oxidized with an aqueous solution of chromic acid to give the corresponding 10,5-(iminomethano)-10,11-dihydro-5H-dibenzo[a,d]cyclohepten-11,13-diones of Formula III in which R is limited as defined above.

10,5-(iminomethano) - 10,11 - dihydro - 5H - dibenzo-[a,d]cyclohepten-11,13-dione may be alkylated according to conventional procedures with an organic halide of formula R—X in which R is as defined above, with the proviso that it may not represent an aliphatic acyl, aroyl, or an aralkanoyl group, and X represents a halogen with an atomic weight greater than 19, to give the corresponding compound of Formula III in which R is limited as defined above.

In their turn, the compounds of Formula III may be treated with a Grignard reagent of formula R''—MgX in which R'' is as defined above and X represents a halogen of atomic weight greater than 19, to give the compounds of Formula I in which R is as defined above with the proviso that it may not represent an aliphatic acyl, aroyl, or an aralkanoyl group, Z is limited to represent the

group and R'' is as defined above.

The compounds of Formula II in which R is as defined above, with the proviso that it may not represent an aliphatic acyl, aroyl, or an aralkanoyl group as defined above, Z is limited to represent either the

group, or the

group, R' is limited to represent hydrogen, and R'' is as defined above may be hydrogenolyzed with a solution of sodium in liquid ammonia to give, respectively, the compounds of Formula II in which R is limited as defined above, Z is limited to represent the

group, or the

group, and R'' is as defined above.

The following formulae and examples will illustrate this invention:

![Formula II structure]

II

![Formula III structure]

III

EXAMPLE 1

10,5-(iminomethano)-10,11-dihydro-5H-dibenzo[a,d]cycloheptene

Lithium aluminium hydride (1.0 g.) is added portionwise to a solution of 10,5-(iminomethano)-10,11-dihydro-5H-dibenzo[a,d]cyclohepten-13-one (3.37 g.) in tetrahydrofuran (60 ml.). The mixture is stirred and refluxed for 2 hours, and cautiously treated with water. The mixture is filtered and the filtrate and washings are dried and evaporated. The residue is purified from hexane to give the title product with M.P. 74–78° C.

The hydrochloride salt is obtained by treating the above compound with hydrogen chloride in either methanol or ether. It is crystallized from ethanol to M.P. greater than 270° C.

EXAMPLE 2

12-methyl-10,5-(iminomethano)-10,11-dihydro-5H-dibenzo[a,d]cycloheptene

In the same manner, but using 12-methyl-10,5-(iminomethano)-10,11-dihydro - 5H - dibenzo[a,d]cyclohepten-13-one as starting material, there is obtained the title compound with M.P. 62–64° C. after crystallization from hexane.

The maleate salt is obtained by treating the above compound with one molar proportion of maleic acid in methanol. It is crystallized from methanol-ether to M.P. 130–133° C.

EXAMPLE 3

12-ethyl-10,5-(iminomethano)-10,11-dihydro-5H-dibenzo[a,d]cycloheptene

In the same manner as described above, but using 12-ethyl - 10,5 - (iminomethano) - 10,11 - dihydro-5H-dibenzo[a,d]cyclohepten-13-one as starting material, the above title product is obtained as an oil. It is characterized by its infra-red absorption spectrum with maxima at 2805, 1490 and 1455 cm.$^{-1}$.

EXAMPLE 4

12-phenethyl-10,5-(iminomethano)-10,11-dihydro-5H-dibenzo[a,d]cycloheptene

In the same manner as described above, but using 12-phenethyl-10,5-(iminomethano) - 10,11 - dihydro-5H-dibenzo[a,d]cyclohepten-13-one as starting material, there is obtained the title compound as an oil characterized by its infra-red spectrum with maxima at 2820, 1480 and 1200 cm.$^{-1}$.

The hydrochloride salt is prepared as described in Example 1. It is crystallized from ethanol-ether to M.P. 225–230° C.

EXAMPLE 5

12-dimethylaminoethyl-10,5-(iminomethano)-10,11-dihydro-5H-dibenzo[a,d]cycloheptene In the same manner as described above, but using 12-dimethylaminoethyl - 10,5 - (iminomethano)-10,11-dihydro-5H-dibenzo[a,d]cyclohepten-13-one as starting material, there is obtained the title compound as an oil characterized by its infra-red spectrum with maxima at 2810, 1485, 1450 and 1095 cm.$^{-1}$.

The dioxalate salt is obtained by treating the above compound with two molar proportions of oxalic acid in either methanol or ether. It is crystallized from methanol to M.P. 206–210° C.

EXAMPLE 6

12-dimethylaminopropyl-10,5-(iminomethano)-10,11-dihydro-5H-dibenzo[a,d]cycloheptene In the same manner as described above, but using 12-dimethylaminopropyl - 10,5 - (iminomethano)-10,11-dihydro-5H-dibenzo[a,d]cyclohepten-13-one as starting material, there is obtained the title compound as an oil characterized by its infra-red spectrum with maxima at 2800, 1480, 1450 and 1110 cm.$^{-1}$.

The dioxalate salt of the above compound is obtained as described in Example 4. It is crystallized from water-isopropanol to M.P. 220–222° C.

EXAMPLE 7

12-diethylaminoethyl-10,5-(iminomethano)-10,11-dihydro-5H-dibenzo[a,d]cycloheptene In the same manner, but using 12-diethylaminoethyl-10,5-(iminomethano)-10,11-dihydro - 5H - dibenzo[a,d]cyclohepten-13-one as starting material there is obtained the title compound as an oil characterized by its infra-red spectrum with maxima at 2820, 1485, 1445 and 1100 cm.$^{-1}$.

The dioxalate salt of the above compound is prepared as described above. It is crystallized from isopropanol-ether to M.P. 120–124° C.

EXAMPLE 8

In the same manner as described in Examples 1–7 inclusive, but using as starting material the 12-propyl-, 12-butyl-, 12-allyl-, 12-benzyl-, 12-trimethoxybenzyl-, 12-di- isopropylaminopropyl-, 12 - pyrrolidinoethyl-, 12 - piperidinoethyl-, 12-(N'-methylpiperazino)ethyl-, or 12-morpholinoethyl-10,5 - (iminomethano)-10,11-dihydro-5H-dibenzo[a,d]cyclohepten-13-one the corresponding 12-propyl-, 12-butyl-, 12-allyl-, 12-benzyl-, 12-trimethoxybenzyl-, 12-diisopropylaminopropyl-, 12-pyrrolidinoethyl-, 12-piperidinoethyl-, 12-(N'-methylpiperazino)ethyl-, or 12-morpholinoethyl-10,5-(iminomethano) - 10,11 - dihydro-5H-dibenzo[a,d]cycloheptene is obtained.

EXAMPLE 9

12-allyl-10,5-(iminomethano)-10,11-dihydro-5H-dibenzo[a,d]cycloheptene

Allyl bromide (3.6 g.) is added to a mixture of 10,5-(iminomethano)-10,11-dihydro - 5H - dibenzo[a,d]cycloheptene (6.6 g.), prepared as described in Example 1, dimethylformamide (50 ml.) and sodium bicarbonate (3.6 g.). The mixture is refluxed for 4 hours, concentrated under reduced pressure and the residue is diluted with water and then extracted with ether. The ethereal extracts are washed, dried, and evaporated, to leave the title compound as an oil characterized by its infra-red spectrum with maxima at 2800, 1495, and 1100 cm.$^{-1}$.

The oxalate salt, prepared as described above, is crystallized from ethanol-ether to M.P. 177–182° C.

EXAMPLE 10

12-acetyl-10,5-(iminomethano)-10,11-dihydro-5H-dibenzo[a,d]cycloheptene

A solution of 10,5-(iminomethano)-10,11-dihydro-5H-dibenzo[a,d]cycloheptene (6.0 g.), prepared as described in Example 1, in a mixture of dry pyridine (25 ml.) and acetic anhydride (10 ml.) is kept at room temperature for 24 hours. The mixture is evaporated to a small volume, diluted with water and the precipitate is purified from ethanol, to yield the title product with M.P. 198–201° C.

EXAMPLE 11

12-phenylacetyl-10,5-(iminomethano)-10,11-dihydro-5H-dibenzo[a,d]cycloheptene

In the same manner as described in Example 10, but using phenylacetyl chloride in place of acetic anhydride, the above title compound is obtained. It is crystallized from dioxan-water to M.P. 202–200° C.

EXAMPLE 12

In the same manner as described in Example 11, but using either propionyl, butyryl, benzoyl, trimethoxybenzoyl, or trimethoxyphenylacetyl chloride in place of phenylacetyl chloride, the corresponding 12-propionyl-, 12-butyryl-, 12-benzoyl-, 12-trimethoxybenzoyl-, or 12-trimethoxyphenylacetyl - 10,5 - (iminomethano)-10,11-dihydro-5H-dibenzo[a,d]cycloheptene is obtained.

EXAMPLE 13

11-hydroxy-10,5-(iminomethano)-10,11-dihydro-5H-dibenzo[a,d]cycloheptene

Lithium aluminium hydride (30.0 g.) is added portionwise to a stirred suspension of 11-hydroxy-10,5-(iminomethano)-10,11-dihydro - 5H - dibenzo[a,d]cyclohepten-13-one (75 g.) in dimethoxyethane (2200 ml.). When the addition is complete the mixture is stirred and refluxed for 5 hours and then cooled and cautiously treated with water. The mixture is filtered and the filtrate is extracted with dilute hydrochloric acid. The acid extracts are basified and extracted with ether. Evaporation of the extracts and crystallization of the residue from chloroform yields the above title product with M.P. 60–64° C.

The hydrochloric acid salt is obtained as described above. It is purified from isopropanol-ether to M.P. 220–225° C.

In the same manner, but using as starting material 12-propyl-, 12-butyl-, 12-allyl, 12-benzyl-, 12-trimethoxybenzyl-, 12-diethylaminoethyl-, 12-dimethylaminopropyl-,

13

12-diisopropylaminopropyl-, 12-pyrrolidinoethyl-, 12-piperidinoethyl-, 12-(N'-methylpiperazino)ethyl-, or 12-morpholinoethyl-11-hydroxy-10,5-(iminomethano)-10,11-dihydro-5H-dibenzo[a,d]cyclohepten-13-one, the corresponding 12-propyl-, 12-butyl-, 12-allyl-, 12-benzyl-, 12-trimethoxybenzyl-, 12-diethylaminoethyl-, 12-dimethylaminopropyl-, 12-diisopropylaminopropyl-, 12-pyrrolidinoethyl-, 12-piperidinoethyl-, 12-(N'-methylpiperazino)ethyl-, or 12-morpholinoethyl - 11 - hydroxy - 10,5 - (iminomethano)-10,11-dihydro - 5H - dibenzo[a,d]cycloheptene is also obtained.

EXAMPLE 14

11-hydroxy-12-methyl-10,5-(iminomethano)-10,11-dihydro-5H-dibenzo[a,d]cycloheptene Lithium aluminium hydride (5.0 g.) is added portionwise to a solution of 11-hydroxy-12-methyl-10,5-(iminomethano)-10,11-dihydro - 5H - dibenzo[a,d]cyclohepten-13-one (10.0 g.) in dimethoxyethane (250 ml.). The mixture is stirred and refluxed overnight, cooled, and cautiously treated with water. The mixture is filtered and the filtrate and washings are evaporated to dryness to give the title compound as an oil characterized by its infrared spectrum with maxima at 3570, 1485, 1445 and 1100 cm.$^{-1}$.

The hydrochloride salt is obtained by treating the above compound with either methanolic or ethereal hydrogen chloride. It is purified from methanol to M.P. 215–220° C.

EXAMPLE 15

11-hydroxy-12-ethyl-10,5-(iminomethano)-10,11-dihydro-5H-dibenzo[a,d]cycloheptene In the same manner as described in Example 14, but using 11 - hydroxy-12-ethyl-10,5-(iminomethano)-10,11-dihydro-5H-dibenzo[a,d]cyclohepten-13-one as starting material, there is obtained the above title compound as an oil characterized by its infra-red spectrum with maxima at 3640, 2800, 1493, 1455, and 1070 cm.$^{-1}$.

The hydrochloride salt is obtained as described above. It is purified from isopropanol to M.P. 215–217° C.

EXAMPLE 16

11-hydroxy-12-phenethyl-10,5-(iminomethano)-10,11-dihydro-5H-dibenzo[a,d]cycloheptene In the same manner as described in Example 14, but using 11-hydroxy-12-phenylacetyl-10,5-(iminomethano)-10,11-dihydro-5H-dibenzo[a,d]cycloheptene as starting material, there is obtained the above compound as an oil characterized by its infra-red spectrum with maxima at 3550, 2790, 1489, 1450 and 1050 cm.$^{-1}$.

The hydrochloric acid salt is prepared as described above. It is purified from methanol to M.P. 209–213° C.

In the same manner, but using as starting material 12-acetyl-, 12-propionyl-, 12-butyryl-, or 12-benzoyl-, 11-hydroxy-10,5-(iminomethano) - 10,11 - dihydro-5H-dibenzo[a,d]cycloheptene the 12-ethyl-, 12-propyl-, 12-butyl-, or 12-benzyl-10,5(iminomethano)-10,11-dihydro-5H-dibenzo[a,d]cycloheptene is also obtained.

EXAMPLE 17

11-hydroxy-12-dimethylaminoethyl-10,5-(iminomethano)-10,11-dihydro-5H-dibenzo[a,d]cycloheptene In the same manner as described above but using 11-hydroxy-12-dimethylaminoethyl - 10,5-(iminomethano)-10,-11-dihydro-5H-dibenzo[a,d]cyclohepten-13-one as starting material and tetrahydrofuran as solvent, there is obtained the title compound as an oil characterized by its infra-red spectrum with maximum at 3650, 2800, 1490, 1450 and 1080 cm.$^{-1}$.

The oxalate salt is obtained as described above. It is purified from isopropanol to M.P. 156–158° C.

14

EXAMPLE 18

11-hydroxy-12-acetyl-10,5-(iminomethano)-10,11-dihydro-5H-dibenzo[a,d]cycloheptene A mixture of 11-hydroxy-10,5-(iminomethano)-10,11-dihydro-5H-dibenzo[a,d]cycloheptene (2.37 g.) dioxan (10 ml.), pyridine (1.1 ml.) and acetic anhydride (1.02 g.) is heated to 50° C. for three hours. The mixture is evaporated and the residue is partitioned between ether and dilute hydrochloric acid. The ethereal phase is washed with water, dried and evaporated to yield the title product as an oil characterized by its infra-red spectrum with maxima at 2850, 1640, 1400 and 870 cm.$^{-1}$.

EXAMPLE 19

11-hydroxy-12-phenylacetyl-10,5-(iminomethano)-10,11-dihydro-5H-dibenzo[a,d]cycloheptene Phenylacetyl chloride (1.55 g.) is added dropwise to a solution of 11-hydroxy-10,5-(iminomethano)-10,11-dihydro-5H-dibenzo[a,d]cycloheptene (2.51 g.), prepared as described in Example 13, in dry dioxan (25 ml.) and dry pyridine (2.0 ml.). The mixture is stirred overnight at room temperature and then concentrated to small volume and diluted with water. The mixture is extracted with chloroform and the washed and dried extracts are evaporated to dryness. The residue is crystallized from isopropanol to give the above title product with M.P. 189–191° C.

In the same manner as described above, but using either propionyl, butyryl, benzoyl, trimethoxybenzoyl or trimethoxyphenylacetyl chloride or bromide in place of phenylacetyl chloride the corresponding 12-propionyl-, 12-butyryl-, 12-benzoyl-, 12-trimethoxybenzoyl-, or 12-trimethoxyphenylacetal-11-hydroxy - 10,5 - (iminomethano) - 10,11 - dihydro-5H-dibenzo[a,d]cycloheptene is also obtained.

EXAMPLE 20

11-methoxy-12-methyl-10,5-(iminomethano)-10,11-dihydro-5H-dibenzo[a,d]cycloheptene In the same manner as described in Example 1, but using 11-methoxy-12-methyl-10,5-(iminomethano)-10,11-dihydro-5H-dibenzo[a,d]cyclohepten-13-one as starting material, there is obtained the title compound with M.P. 122–125° C. after crystallization from hexane.

The oxalate salt of the above compound is obtained as described above. It is crystallized from methanol to M.P. 115–110° C.

EXAMPLE 21

11-ethoxy-12-methyl-10,5(-iminomethano)-10,11-dihydro-5H-dibenzo[a,d]cycloheptene In the same manner as described in Example 1, but using 11-ethoxy-12-methyl - 10,5-(iminomethano)-10,11-dihydro-5H-dibenzo[a,d]cyclohepten-13-one as starting material, there is obtained the title compound as an oil characterized by its infra-red spectrum with maxima at 2810, 1460 and 1090 cm.$^{-1}$.

The oxalate salt of the above compound is obtained as described above. It is crystallized from acetonitrile to M.P. 165–171° C.

EXAMPLE 22

11-propoxy-12-methyl-10,5-(iminomethano)-10,11 dihydro-5H-dibenzo[a,d]cycloheptene In the same manner as described in Example 1, but using 11-propoxy - 12 - methyl-10,5-(iminomethano)-10,11-dihydro - 5H - dibenzo[a,d]cyclohepten-13-one as starting material, the above title product is obtained as an oil characterized by its infra-red spectrum with maxima at 2810, 1487, 1458 and 1086 cm.$^{-1}$.

The hydrochloride salt of the above compound is obtained as described above. It is crystallized from isopropanol-ether to M.P. 192–194° C.

EXAMPLE 23

11-ethoxy-12-ethyl-10,5-(iminomethano)-10,11-dihydro-5H-dibenzo[a,d]cycloheptene In the same manner, but using 11-ethoxy-12-ethyl-10,5-(iminomethano) - 10,11 - dihydro-5H-dibenzo[a,d] cyclohepten-13-one as starting material, there is obtained the title compound as an oil characterized by its infra-red spectrum with maxima at 2820, 1450 and 1075 cm.$^{-1}$.

The oxalate salt of the above compound is obtained as described above. It is crystallized from isopropanol to M.P. 155–160° C.

In the same manner, but using as starting materials 11-methoxy-, 11-ethoxy-, 11-propoxy-, 11-butoxy-, 11-allyloxy-, 11-benzyloxy-, 11-(β-phenethyloxy)-, 11-trimethoxybenzyloxy, 11-dimethylaminoethoxy, 11-diethylaminoethoxy-, 11-dimethylaminopropoxy, 11-diisopropylaminopropoxy, 11-pyrrolidinoethoxy, 11-piperidinoethoxy, 11-(N'-methylpiperazino)ethoxy, or 11 - morpholinoethoxy-12-substituted-10,5-(iminomethano) - 10,11 - dihydro-5H-dibenzo[a,d]cyclohepten-13-ones in which the 12-substituent is the methyl, ethyl, propyl, allyl, butyl, benzyl, phenethyl, trimethoxybenzyl, dimethylaminoethyl, diethylaminoethyl, dimethylaminopropyl, diisopropylaminopropyl, pyrrolidinoethyl, piperidinoethyl, (N'-methylpiperazino)ethyl, or the morpholinoethyl group, the 11-methoxy-, 11-ethoxy-, 11-propoxy, 11-butoxy, 11-allyloxy, 11-benzyloxy, 11-(β-phenethyloxy), 11-trimethoxybenzyloxy, 11-dimethylaminoethoxy, 11-diethylaminoethoxy, 11-dimethylaminopropoxy, 11-diisopropylaminopropoxy, 11-pyrrolidinoethoxy, 11-piperidinoethoxy, 11-(N'-methylpiperazino)ethoxy, or 11-morpholinoethoxy derivatives of 12-methyl-, 12-ethyl-, 12-propyl-, 12-butyl-, 12-allyl-, 12-benzyl-, 12-phenethyl-, 12-trimethoxybenzyl-, 12-dimethylaminoethyl-, 12-diethylaminoethyl-, 12-dimethylaminopropyl-, 12-diisopropylaminopropyl-, 12-pyrrolidinoethyl-, 12-piperidinoethyl-, 12-(N'-methylpiperazino)ethyl-, or 12-morpholinoethyl-10,5-(iminomethano) - 10,11 - dihydro-5H-dibenzo[a,d]cycloheptenes are also obtained.

EXAMPLE 24

11-acetoxy-12-methyl-10,5-(iminomethano)-10,11-dihydro-5H-dibenzo[a,d]cycloheptene Acetic anhydride (1.02 g.) is added to a solution of 11-hydroxy-12-methyl-10,5-(iminomethano) - 10,11 - dihydro-5H-dibenzo[a,d]cycloheptene (2.51 g.), prepared as described in Example 14, in a mixture of dry dioxan (25 ml.) and dry pyridine (1.0 ml.). The mixture is refluxed for 6 hours, concentrated to small volume, diluted with water and extracted with chloroform. The combined extracts are washed with dilute hydrochloric acid and then with water and then dried and evaporated to leave the title product characterized by its infra-red absorpion spectrum with maxima at 2860, 2810, 1725, 1480 and 1450 cm.$^{-1}$.

EXAMPLE 25

11-phenylacetoxy-12-methyl-10,5-(iminomethano)-10,11-dihydro-5H-dibenzo[a,d]cycloheptene To a stirred solution of 11-hydroxy-12-methyl-10,5-(iminomethano)-10,11-dihydro - 5H - dibenzo[a,d]cycloheptene (2.51 g.) prepared as described in Example 14, in a mixture of dry dioxan (25 ml.) and dry pyridine (2.0 ml.) is added phenylacetyl chloride (1.55 g.). The mixture is stirred at room-temperature for 6 hours, evaporated to small volume, diluted with water and extracted with chloroform. The chloroform extracts are washed with dilute hydrochloric acid and with water. The dried extracts are evaporated to leave the title product as an oil characterized by its infra-red spectrum with maxima at 2860, 2810, 1728, 1490 and 1460 cm.$^{-1}$.

In the same manner, but using propionic anhydride, butyryl chloride, benzoyl chloride, trimethoxybenzoyl chloride or trimethoxyphenylacetyl chloride in the place of phenylacetyl chloride, the corresponding 11-propionoxy, 11-butyryloxy-, 11-benzoyloxy, 11-trimethoxybenzoyloxy-, or 11-trimethoxyphenylacetoxy-12 - methyl - 10,5-(iminomethano)-10,11-dihydro - 5H - dibenzo[a,d]cycloheptene is also obtained.

In the same manner as described in Examples 24 and 25, but using as starting materials the 12-ethyl-, 12-propyl-, 12-butyl-, 12-allyl-, 12-benzyl-, 12-phenethyl-, 12-trimethoxybenzyl-, 12 - dimethylaminoethyl-, 12 - diethylaminoethyl-, 12 - dimethylaminopropyl-, 12 - disopropylaminopropyl-, 12-pyrrolidinoethyl-, 12-piperidinoethyl-, 12-(N'-methylpiperazino)ethyl-, or 12-morpholinoethyl - 11 - hydroxy-10,5-(iminomethano)-10,11-dihydro - 5H - dibenzo[a,d]cycloheptenes, and reacting these latter compounds with acetic anhydride, propionic anhydride, butyryl chloride, benzoyl chloride, phenylacetyl chloride, trimethoxybenzoyl chloride, or trimethoxyphenylacetyl chloride, the 11-acetoxy, 11-propionoxy, 11-butyryloxy, 11-benzoyloxy, 11-phenylacetoxy, 11 - trimethoxybenzoyloxy, or 11 - trimethoxyphenylacetoxy derivatives of the 12-ethyl-, 12-propyl-, 12-butyl-, 12-allyl-, 12-benzyl-, 12-phenethyl-, 12-trimethoxybenzyl, 12 - dimethylaminoethyl-, 12 - diethylaminoethyl-, 12 - dimethylaminopropyl-, 12 - pyrrolidinoethyl-, 12 - piperidinoethyl-, 12 - (N' - methylpiperazino) ethyl-, and 12-morpholinoethyl-10,5-(iminomethano)-10,11-dihydro - 5H - dibenzo[a,d]cycloheptenes are also obtained.

EXAMPLE 26

11-methoxy-12-allyl-10,5-(iminomethano)-10,11-dihydro-5H-dibenzo[a,d]cycloheptene A mixture of 11-methoxy -10,5-(iminomethano)-10,11-dihydro-5H-dibenzo[a,d]cycloheptene (2.51 g.), dimethylformamide (10 ml.), allyl bromide (1.21 g.) and sodium bicarbonate (5.0 g.) was heated at 70° C. for 6 hours. The mixture was filtered, concentrated to small volume and the residue was partitioned between ether and water. The ethereal phase was evaporated to leave the product as an oil which was characterized as its oxalate salt which was purified from isopropanol to M.P. 175–177° C.

EXAMPLE 27

11-methoxy-12-acetyl-(iminomethano)-10,11-dihydro-5H-dibenzo[a,d]cycloheptene Sodium hydride (450 mg. of a 54% suspension) is added to a solution of 11-hydroxy-12-acetyl-10,5-(iminomethano)-10,11-dihydro - 5H - dibenzo[a,d]cycloheptene (2.79 g.), prepared as described in Example 18. The mixture is refluxed for 1 hour and then methyl iodide (1.42 g.) is added. The mixture is refluxed for 4 hours, concentrated to small volume and diluted with water. The precipitate is collected and purified from methanol to give the title product with M.P. 176–179° C.

EXAMPLE 28

11-methoxy-12-phenylacetyl-1,5-(iminomethano)-10,11-dihydro-5H-dibenzo[a,d]cycloheptene In the same manner as described in Example 27, but using 11-hydroxy-12-phenylacetyl-10,5 - (iminomethano)-10,11-dihydro - 5H - dibenzo[a,d]cycloheptene as starting material, there is obtained the title compound with M.P. 139–141° C. after crystallization from benzene-hexane.

In the same manner, but using as starting materials the 12-acetyl-, 12-propionyl-, 12-butyryl-, 12-benzoyl, 12-phenylacetyl-, 12-trimethoxybenzoyl-, or 12-trimethoxyphenylacetyl-11-hydroxy-10,5-(iminomethano) - 10,11-dihydro-5H-dibenzo[a,d]cycloheptenes and methyl, ethyl, propyl, butyl, allyl, benzyl, phenethyl, trimethoxybenzyl, dimethylaminoethyl, diethylaminoethyl, dimethylaminopropyl, diisopropylaminopropyl, pyrrolidinoethyl, piperidinoethyl, (N' - methylpiperazino)ethyl or morpholinoethyl chloride or bromide or iodide, the 11-methoxy, 11-ethoxy, 11-propxy, 11-butoxy, 11-allyloxy, 11-benzyloxy, 11-phenethyloxy, 11-trimethoxybenzyloxy, 11-dimethylaminoethoxy, 11-diethylaminoethoxy, 11-dimethylaminopropoxy, 11 - diisopropylaminopropoxy, 11 - pyrrolidylethoxy, 11 - piperidinoethoxy, 11 - (N'-methylpiperazino) ethoxy or 11-morpholinoethoxy derivatives of 12-acetyl-, 12-propionyl-, 12-butyryl-, 12-benzoyl-, 12-phenylacetyl-, 12-trimethoxybenzoyl-, or 12-trimethoxyphenylacetyl-10, 5-(iminomethano)-10,11-dihydro-5H - dibenzo[a,d]cycloheptenes are also obtained.

EXAMPLE 29

11-acetoxy-12-acetyl-10,5-(iminomethano)-10,11-dihydro-5H-dibenzo[a,d]cycloheptene A mixture of 11-hydroxy-12 - acetyl - 10,5 - (iminomethano)-10,11-dihydro - 5H - dibenzo[a,d]cycloheptene (1.0 g.), acetic anhydride (5 ml.) and pyridine (0.2 ml.) was heated on the steam bath for 3 hours. The mixture was concentrated to small volume, diluted with water, and extracted with ether. The extracts were washed, dried and evaporated and the residue was crystallized from isopropanol to give the title product with M.P. 192–194° C.

In the same manner, but using as starting materials the compounds described in Examples 18 and 19 and acetic anhydride, propionyl chloride, butyryl chloride, benzoyl chloride, phenylacetyl chloride, trimethoxybenzyl chloride, or trimethoxyphenylacetyl chloride the 11-acetoxy, 11-propionoxy, 11-butyryloxy, 11-benzoyloxy, 11-phenylacetoxy, 11 - trimethoxybenzoyloxy, and 11 - trimethoxyphenylacetoxy derivatives of 12-acetyl-, 12-propionyl-, 12-butyryl-, 12-benzoyl- 12 - phenylacetyl-, 12 - trimethoxybenzoyl-, and 12-trimethoxyphenylacetyl - 10,5 - (iminomethano)-10,11-dihydro-5H - dibenzo[a,d]cycloheptenes are also obtained.

EXAMPLE 30

11-methoxy-10,5-(iminomethano)-10-11-dihydro-5H-dibenzo[a,d]cycloheptene

A solution of 11 - methoxy - 12 - acetyl - 10,5 - (iminomethano)-10,11 - dihydro - 5H - dibenzo[a,d]cycloheptene (1.0 g.) in 5 N ethanolic potassium hydroxide solution (10 ml.) and water (2 ml.) is refluxed for 2 days. The mixture is evaporated to dryness and the residue is partitioned between ether and water. The ethereal phase is then extracted with dilute hydrochloric acid and the acid extracts are basified and ether extracted. The washed and dried extracts are evaporated to leave the title product as an oil characterized by its infra-red spectrum with maxima at 3350, 2940, 1480, 1450 and 1075 cm.$^{-1}$.

This compound is converted to its hydrochloric acid salt as described above. It has M.P. 222–227° C. when purified from isopropanol-ether.

In the same manner, but using as starting material the 11-ethoxy, 11-propoxy-, 11-butoxy-, 11-allyloxy-, 11-benzyloxy-, 11-phenethyloxy-, 11-trimethoxybenzyloxy-, 11-dimethylaminoethoxy-, 11 - diethylaminoethoxy-, 11 - dimethylaminopropoxy-, 11-diisopropylaminopropoxy-, 11-pyrrolidinoethoxy-, 11-piperidinoethoxy-, 11-(N'-methylpiperazino)ethoxy-, or 11 - morpholinoethoxy-12 - acetyl-10,5 - (iminomethano) - 10,11 - dihydro - 5H - dibenzo[a,d]cycloheptene, prepared as described in Example 28, the corresponding 11-ethoxy-, 11-propoxy-, 11-butoxy-, 11 - allyloxy-, 11 - benzyloxy-, 11 - phenethyloxy-, 11 - trimethoxybenzyloxy-, 11-dimethylaminoethoxy-, 11-diethylaminoethoxy-, 11-dimethylaminopropoxy-, 11-diisopropylaminopropoxy-, 11-pyrrolidinoethoxy-, 11-piperidinoethoxy-, 11-(N'-methylpiperazino)ethoxy-, or 11-morpholinoethoxy - 10,5 - (iminomethano) - 10,11 - dihydro - 5H-dibenzo[a,d]cycloheptene is respectively obtained.

EXAMPLE 31

11-acetoxy-10,5-(iminomethano)-10,11-dihydro-5H-dibenzo[a,d]cycloheptene

A mixture of 11-hydroxy-10,5-(iminomethano)-10,11-dihydro-5H-dibenzo[a,d]cycloheptene (2.37 g.), carbobenzoxy chloride (1.6 g.), dioxan (20 ml.) and pyridine (2.0 ml.) is kept at room temperature for twelve hours. Acetic anhydride (1.02 g.) is then added to the mixture which is then kept at room temperature overnight. The solution is concentrated to small volume, diluted with water and extracted with chloroform and the extracts are evaporated to dryness.

The residue is dissolved in ethanol, 10% palladium charcoal catalyst (0.5 g.) is added to the solution and hydrogen is passed through the resulting solution for 6 hours.

The mixture is filtered and the filtrate is evaporated to dryness and the residue is partitioned between ether and dilute hydrochloric acid. The acid phase is basified with sodium bicarbonate solution and then extracted with ether. The ethereal extracts are washed, dried, and evaporated to leave the title product.

In the same manner, but using either propionyl, butyryl, benzoyl, phenylacetyl, trimethoxybenzoyl, or trimethoxyphenylacetyl chloride in place of acetic anhydride, the corresponding 1-propionoxy-, 11-butyryloxy-, 11-benzoyloxy-, 11-phenylacetoxy-, 11-trimethoxybenzoyloxy-, or 11-trimethoxyphenylacetoxy- 10,5-(iminomethano)-10,11-dihydro-5H-dibenzo[a,d]cycloheptene is also obtained.

EXAMPLE 32

11-hydroxy-11-phenyl-12-methyl-10,5-(iminomethano)-10,11-dihydro-5H-dibenzo[a,d]cycloheptene In the same manner as described in Example 1, but using 11 - hydroxy - 11 - phenyl - 12 - methyl - 10,5 - (iminomethano) - 10,11 - dihydro - 5H - dibenzo[a,d]cyclohepten-13-one as starting material, the above title product is obtained.

It is purified from hexane to M.P. 115–116° C. The oxalate salt is prepared as described above. It is purified from isopropanol to M.P. 153–157° C.

EXAMPLE 33

11-hydroxy-11-phenyl-10,5-(iminomethano)-10,11-dihydro-5H-dibenzo[a,d]cycloheptene In the same manner as described in Example 1 but using 11 - hydroxy - 11 - phenyl - 10,5 - (iminomethano)-10,11 - dihydro - 5H - dibenzo[a,d]cyclohepten - 13 - one as starting material, the above title product is obtained as an oil characterized by its infra-red specturm with maxima at 3600, 2800, 1493 and 1450 cm.$^{-1}$.

The hydrochloride salt prepared as described above, is purified from isopropanol-ether to M.P. 238–240° C.

EXAMPLE 34

11-hydroxy-11,12-dimethyl-10,5-(iminomethano)-10,11-dihydro-5H-dibenzo[a,d]cycloheptene In the same manner as described in Example 1 but using 11 - hydroxy - 11,12 - dimethyl - 10,5 - (iminomethano) - 10,11 - dihydro - 5H - dibenzo[a,d]cyclohepten-13-one as starting material the above title product is obtained, which is characterized by its infra-red spectrum with maxima at 3580, 2820, 1490 and 1450 cm.$^{-1}$.

The hydrochloride salt, prepared as described above, is purified from ethanol-ether to M.P. 275–280° C.

EXAMPLE 35

11 - hydroxy - 11 - dimethylaminopropyl - 12 - propyl - 10,5 - (iminomethano) - 10,11 - dihydro - 5H - dibenzo[a,d]cycloheptene In the same manner as described in Example 1, but using 11 - hydroxy - 11 - dimethylaminopropyl - 12 - propyl - 10,5 - (iminomethano) - 10,11 - dihydro - 5H - dibenzo[a,d]cyclohepten-13-one as starting material the above title product is obtained characterized by its infrared absorption spectrum with maxima at 3650, 2750, 1493, and 1453 cm.$^{-1}$.

EXAMPLE 36

In the same manner as described in Examples 32–35, but using as starting material the 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, or 11-diisopropylaminopropyl - 11 - hydroxy - 10,5 - (iminomethano) - 10,11 - dihydro - 5H - dibenzo[a,d]cyclohepten - 13 - one, the corresponding 11-methyl-, 11-ethyl-, 11-propyl-, 11-butyl-, 11-allyl-, 11-phenyl-, 11-benzyl-, 11-phenethyl-, 11-trimethoxybenzyl-, 11 - dimethylaminopropyl-, 11 - diethylaminopropyl-, or 11-diisopropylaminopropyl-11-hydroxy-10,5 - (iminomethano) - 10,11 - dihydro - 5H - dibenzo[a,d]cycloheptene is obtained.

In the same manner as described in Examples 32–35, but using as starting materials the 12-methyl, 12-ethyl, 12-propyl, 12-butyl, 12-allyl, 12-benzyl, 12-phenethyl, 12-trimethoxybenzyl, 12-dimethylaminoethyl, 12-diethylaminoethyl, 12-dimethylaminopropyl, 12-diisopropylaminopropyl, 12-pyrrolidinoethyl, 12-piperidinoethyl, 12-(N'-methylpiperazino)ethyl, or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, and 11-diisopropylaminopropyl-11-hydroxy-10,5-(iminomethano)-10,11- dihydro - 5H - dibenzo[a,d]cyclohepten-13-ones as starting materials, the 12-methyl, 12-ethyl 12-propyl, 12-butyl, 12-allyl, 12-benzyl, 12-phenethyl, 12-trimethoxybenzyl, 12-dimethylaminoethyl, 12-diethylaminoethyl, 12-dimethylaminopropyl, 12-diisopropylaminopropyl, 12-pyrrolidinoethyl, 12-piperidinoethyl, 12-(N'-methylpiperazino)-ethyl, or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, and 11-diisopropylaminopropyl - 11 - hydroxy-10,5-(iminomethano) - 10,11 - dihydro-5H-dibenzo[a,d]-cycloheptenes are also obtained.

EXAMPLE 37

11-methyl-10,5-(iminomethano)-10,11-dihydro-5H-dibenzo[a,d]cycloheptene

In the same manner as described in Example 1, but using 11-methyl - 10, 5 - (iminomethano)-10,11-dihydro-5H-dibenzo[a,d]-cyclohepten-13-one as starting material, there is obtained the title compound as an oil, characterized by its infra-red spectrum with maxima at 2860, 1445 and 1130 cm.$^{-1}$.

EXAMPLE 38

11-dimethylaminopropyl-10,5-(iminomethano)-10,11-dihydro-5H-dibenzo[a,d]cycloheptene In the same manner as described in Example 1, but using 11-dimethylaminopropyl - 10,5 - (iminomethano)-10,11-dihydro - 5H - dibenzo[a,d]cyclohepten-13-one as starting material, there is obtained the title compound with M.P. 79–85° C. after crystallization from hexane.

EXAMPLE 39

11,12-dimethyl-10,5-(iminomethano)-10,11-dihydro-5H-dibenzo[a,d]cycloheptene

In the same manner as described in Example 1, but using 11,12-dimethyl - 10,5 - (iminomethano)-10,11-dihydro-5H-dibenzo[a,d]cyclohepten-13-one (1.0 g.) as starting material, the title product is obtained as an oil characterized by its infra-red spectrum with maxima at 2810, 1450 and 1100 cm.$^{-1}$.

The hydrochloric acid salt is prepared by treating the above compound with either methanolic or ethereal hydrogen chloride. It is purified from isopropanol-ether to M.P. greater than 260° C.

Alternatively, a mixture of 11-methyl-10,5-(iminomethano) - 10,11 - dihydro-5H-dibenzo[a,d]cycloheptene (2.0 g.), formic acid (10 ml.) and formaldehyde solution (10 ml.) is heated on the steam bath for 2 hours. The mixture is evaporated, treated with sodium bicarbonate solution and ether extracted. The extracts are evaporated to dryness to leave the above title product.

EXAMPLE 40

11-benzyl-12-methyl-10,5-(iminomethano)-10,11-dihydro-5H-dibenzo[a,d]cycloheptene In the same manner as described in Example 1, but using 11-benzyl - 12 - methyl-10,5-(iminomethano)-10,11-dihydro-5H-dibenzo[a,d]cyclohepten-13-one as starting material, there is obtained the title compound with M.P. 124–128° C. after crystallization from hexane.

The oxalate salt is obtained by treating the above compound with an ethereal solution of oxalic acid. It is purified from methanol to M.P. 192–195° C.

EXAMPLE 41

11-dimethylaminopropyl-12-methyl-10,5-(iminomethano)-10,11-dihydro-5H-dibenzo[a,d]cycloheptene In the same manner as described in Example 1, but using 11-dimethylaminopropyl - 12 - methyl-10,5-(iminomethano)-10,11-dihydro - 5H - dibenzo[a,d]cyclohepten-13-one as starting material, there is obtained the title compound as an oil characterized by its infra-red absorption spectra with maxima at 2800, 1490, 1455 and 1100 cm.$^{-1}$.

Alternatively, a mixture of 11-dimethylaminopropyl-10,5-(iminomethano) - 10,11 - dihydro-5H-dibenzo[a,d]cycloheptene (1.0 g.), formic acid (5 ml.) and formaldehyde is heated on the steam bath for 1 hour. The mixture is evaporated, diluted with water, treated with sodium bicarbonate solution and ether extracted. The extracts are evaporated to dryness to leave the above title product.

EXAMPLE 42

11-phenyl-12-ethyl-10,5-(iminomethano)-10,11-dihydro-5H-dibenzo[a,d]cycloheptene In the same manner as described in Example 1, but using 11-phenyl - 12 - ethyl-10,5-(iminomethano)-10,11-dihydro-5H-dibenzo[a,d]cyclohepten - 13 - one as starting material, the above title product is obtained as an oil which is characterized by its infra-red spectrum with maxima at 2800, 1490, 1453 and 1110 cm.$^{-1}$.

EXAMPLE 43

In the same manner as described in Example 1, but using 11-ethyl-, 11-propyl-, 11-butyl-, 11-allyl-, 11-phenethyl-, 11-trimethoxybenzyl-, 11-diethylaminopropyl-, or 11-diisopropyl-aminopropyl - 10,5 - (iminomethano)-10,-11-dihydro-5H-dibenzo[a,d]cyclohepten-13-one as starting material, the corresponding 11-ethyl-, 11-propyl-, 11-buytl-, 11-allyl-, 11-phenyl-, 11-phenethyl-, 11-trimethoxybenzyl-, 11-diethylaminopropyl-, or 11-diisopropylaminopropyl - 10,5 - (iminomethano)-10,11-dihydro-5H-dibenzo[a,d]cycloheptene is also obtained.

In the same manner as described in Example 1, but using as starting materials the 12-methyl, 12-ethyl, 12-propyl, 12-butyl, 12-allyl, 12-benzyl, 12-phenethyl, 12-trimethoxybenzyl, 12 - dimethylaminoethyl, 12 - diethylaminoethyl, 12 - dimethylaminopropyl, 12 - diisopropylaminopropyl, 12-pyrrolidinoethyl, 12-piperidinoethyl, 12-(N'-methylpiperazino)ethyl or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, and 11-diisopropylaminopropyl-10,5-(iminomethano)-10,11-dihydro-5H-dibenzo[a,d]cyclohepten-13 - ones as starting materials, the 12-methyl, 12-ethyl, 12-propyl, 12-butyl, 12-allyl, 12-benzyl-, 12-phenethyl, 12-trimethoxybenzyl, 12-dimethylaminoethyl, 12-diethylaminoethyl, 12-dimethylaminopropyl, 12-diisopropylaminopropyl, 12-pyrrolidinoethyl, 12-piperidinoethyl, 12-(N'-methylpiperazino)ethyl or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11 - triethylaminopropyl-, and 11-diisopropylaminopropyl-10,5-(iminomethano) - 10,11-dihydro-5H-dibenzo[a,d]cycloheptenes are also obtained.

EXAMPLE 44

In a similar manner as described in Example 19, but using the 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl- and 11-diisopropylaminopropyl-11-hydroxy-10,5-(iminomethano)-10,11-dihydro - 5H - dibenzo[a,d]cycloheptenes and acetyl, propionyl, butyryl, benzoyl, phenylacetyl, trimethoxybenzoyl, and trimethoxyphenylacetyl chlorides as starting materials, the 12-acetyl, 12-propionyl, 12-butyryl, 12-benzoyl, 12-phenylacetyl, 12-trimethoxybenzoyl and 12-trimethoxyphenylacetyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl- and 11-diisopropylaminopropyl-11-hydroxy - 10,5 - (iminomethano)-10,11-dihydro-5H - dibenzo[a,d]cycloheptenes are also obtained.

EXAMPLE 45

In a similar manner as described in Example 19, but using 11-methyl-, 11-ethyl-, 11-propyl-, 11-butyl-, 11-allyl-, 11-phenyl-, 11-benzyl-, 11-phenethyl-, 11-trimethoxybenzyl-, 11 - dimethylaminopropyl-, 11 - diethylaminopropyl-, and 11-diisopropylaminopropyl-10,5-(iminomethano)-10,11-dihydro-5H - dibenzo[a,d]cycloheptenes and acetyl, propionyl, butyryl, benzoyl, phenylacetyl, trimethoxybenzoyl, and trimethoxyphenylacetyl chlorides as starting materials, the 12-acetyl, 12-propionyl, 12-butyryl, 12-benzoyl, 12-phenylacetyl, 12-trimethoxybenzoyl, and 12-trimethoxyphenylacetyl derivatives of 11-methyl-, 11-ethyl-, 11-propyl-, 11-butyl, 11-allyl, 11-phenyl-, 11-benzyl-, 11-phenethyl-, 11-trimethoxybenzyl-, 11-dimethylaminopropyl-, 11 - diethylaminopropyl-, and 11 - diisopropylaminopropyl-10,5-(iminomethano) - 10,11 - dihydro-5H-dibenzo[a,d]cycloheptenes are also obtained.

We claim:

1. A compound selected from the group which consists of compounds of the formulae:

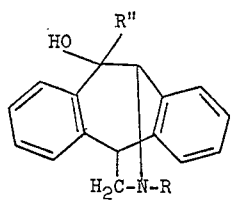 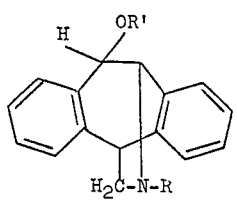

where R is selected from the group which consists of hydrogen, lower alkyl of from 1 to 4 carbon atoms, allyl, benzyl, phenethyl, trimethoxybenzyl, dimethylaminoethyl, diethylaminoethyl, dimethylaminopropyl, diethylaminopropyl, diisopropylaminopropyl, pyrrolidinoethyl, piperidinoethyl, N'-methylpiperazino)ethyl and morpholinoethyl; and R' is selected from the group which consists of hydrogen, lower alkyl of from 1 to 4 carbon atoms, allyl, benzyl, phenethyl, trimethoxybenzyl, dimethylaminoethyl, diethylaminoethyl, dimethylaminopropyl, diethylaminopropyl, diisopropylaminopropyl, pyrrolidinoethyl, piperidinoethyl, (N'-methylpiperazino)ethyl, morpholinoethyl, acetyl, propionyl, butyryl, benzoyl, trimethoxybenzoyl, phenylacetyl, and trimethoxyphenylacetyl, and R" is selected from the group which consists of lower alkyl or from 1 to 4 carbon atoms, allyl, phenyl, benzyl, phenethyl, dimethylaminopropyl, diethylaminopropyl and diisoproplaminopropyl, and acid addition salts thereof with pharmacologically acceptable acids.

2. 11-hydroxy-10,5-(iminomethano) - 10,11 - dihydro-5H-dibenzo[a,d]cycloheptene, as claimed in claim 1.

3. 11-hydroxy - 12 - methyl-10,5-(iminomethano)-10,11-dihydro-5H-dibenzo[a,d]cycloheptene, as claimed in claim 1.

4. 11-hydroxy - 12 - ethyl-10,5-(iminomethano)-10,11-dihydro-5H-dibenzo[a,d]cycloheptene, as claimed in claim 1.

5. 11-hydroxy - 12 - phenethyl-10,5-(iminomethano)-10,11-dihydro-5H-dibenzo[a,d]cycloheptene, as claim in claim 1.

6. 11-hydroxy - 12 - dimethylaminoethyl-10,5-(iminomethano)-10,11-dihydro - 5H - dibenzo[a,d]cycloheptene, as claimed in claim 1.

7. 11-hydroxy - 12 - acetyl-10,5-(iminomethano)-10,11-dihydro-5H-dibenzo[a,d]cycloheptene.

8. 11-hydroxy - 12 - phenylacetyl-10,5-(iminomethano)-10,11-dihydro-5H-dibenzo[a,d]cycloheptene.

9. 11-methoxy - 12 - methyl-10,5-(iminomethano)-10,11-dihydro-5H-dibenzo[a,d]cycloheptene, as claimed in claim 1.

10. 11-ethoxy - 12 - methyl-10,5-(iminomethano)-10,11-dihydro-5H-dibenzo[a,d]cycloheptene, as claimed in claim 1.

11. 11-propoxy - 12 - methyl-10,5-(iminomethano)-10,11 - dihydro-5H-dibenzo[a,d]cycloheptene, as claimed in claim 1.

12. 11-ethoxy - 12 - ethyl-10,5-(iminomethano)-10,11-dihydro-5H-dibenzo[a,d]cycloheptane, as claimed in claim 1.

13. 11-acetoxy - 12 - methyl-10,5-(iminomethano)-10,11-dihydro-5H-dibenzo[a,d]cycloheptene, as claimed in claim 1.

14. 11-phenylacetoxy - 12 - methyl-10,5-(iminomethano) - 10,11 - dihydro-5H-dibenzo[a,d]cycloheptene, as claimed in claim 1.

15. 11-methoxy - 12 - allyl-10,5-(iminomethano)-10,11-dihydro-5H-dibenzo[a,d]cycloheptene, as claimed in claim 1.

16. 11-methoxy - 12 - acetyl-10,5-(iminomethano)-10,11-dihydro-5H-dibenzo[a,d]cycloheptene.

17. 11-methoxy - 12 - phenylacetyl-10,5-(iminomethano) - 10,11 - dihydro-5H-dibenzo[a,d]cycloheptene.

18. 11-acetoxy - 12 - acetyl-10,5-(iminomethano)-10,11-dihydro-5H-dibenzo[a,d]cycloheptene.

19. 11-methoxy-10,5-(iminomethano) - 10,11 - dihydro-5H-dibenzo[a,d]cycloheptene, as claimed in claim 1.

20. 11-hydroxy - 11 - phenyl-12-methyl-10,5-(iminomethano)-10,11-dihydro - 5H - dibenzo[a,d]cycloheptene, as claimed in claim 1.

21. 11-hydroxy-11-phenyl - 10,5 - (iminomethano)-10,11-dihydro-5H-dibenzo[a,d]cyclopheptene, as claimed in claim 1.

22. 11-hydroxy - 11,12 - dimethyl-10,5-(iminomethano)-10,11-dihydro - 5H - dibenzo[a,d]cycloheptene, as claimed in claim 1.

23. 11-hydroxy-11-dimethylaminopropyl - 12 - propyl-10,5-(iminomethano)-10,11-dihydro - 5H - dibenzo[a,d]cycloheptene, as claimed in claim 1.

References Cited

UNITED STATES PATENTS

| | | | |
|---|---|---|---|
| 3,310,565 | 3/1967 | Galantay | 260—288 |
| 3,361,767 | 2/1968 | Dobson | 260—343.2 |
| 3,403,156 | 9/1968 | Humber et al. | 260—286 |
| 3,403,157 | 9/1968 | Humber et al. | 260—288 |

OTHER REFERENCES

Waldman et al., Ann. vol. 609, pp. 125–43 (1957), abstracted in Chem. Abstr. vol. 52, col. 16365–6 and subject index 6022S (1958).

Battersby et. al., J. Chem. Soc. 1958, pp. 1988–91, abstracted in Chem Abstr. vol. 52, col. 17311–2 (1958).

DONALD G. DAUS, Primary Examiner

U.S. Cl. X.R.

260—247.5, 268, 286, 288, 289, 239.3, 544; 424—258